Patented Apr. 10, 1945

2,373,298

UNITED STATES PATENT OFFICE 2,373,298

DERIVATIVES OF BENZYL SULPHONIC ACIDS

Gregg Dougherty, Princeton, and Robert H. Barth, Ridgewood, N. J., assignors, by mesne assignments, to Heyden Chemical Corporation, a corporation of Delaware No Drawing. Application March 16, 1942, Serial No. 434,918

5 Claims. (Cl. 260—456)

This invention relates to novel compounds which may be prepared from benzyl sulphonyl chloride or substituted benzyl sulphonyl chlorides by addition of the benzyl sulphonyl chloride to an aqueous solution of a phenolic compound having a replaceable phenolic hydrogen atom and which is selected from the class of phenols and naphthols in the presence of caustic alkali.

These new compounds are phenyl benzyl sulphonates or esters of phenols and benzyl sulphonic acids of this general formula—

$$XC_6H_4-CH_2-SO_2-O-R$$

where R is a phenyl, substituted phenyl, $\alpha$-naphthyl, substituted $\alpha$-naphthyl, $\beta$-naphthyl or substituted $\beta$-naphthyl radical and where X is an alkyl, halogen, nitro or hydrogen radical.

These compounds are useful intermediates and useful plasticizers for a variety of resins.

In general, the esters of benzyl sulphonic acids may be made by reacting equimolar proportions of the sulphonyl chloride, the phenol and sodium hydroxide in water.

The examples listed below are chosen to demonstrate the variety of compounds prepared and are not included for the purpose of limiting the invention. Parts are by weight.

*Example 1.—Phenyl benzyl sulphonate*
$(C_6H_5-CH_2-SO_2-O-C_6H_5)$ 19 parts (0.1 mol) of benzyl sulphonyl chloride is added to a solution of 10 parts of phenol in 50 parts of water containing 5 parts of sodium hydroxide. The temperature rises as the benzyl sulphonyl chloride is stirred into the solution. The aqueous layer is alkaline at the end of the reaction. Upon cooling, the precipitated material is filtered, washed with water, and crystallized from methyl alcohol. Upon drying the product, it was found to melt at 80–81° C.

*Example 2.—$\beta$-Naphthyl benzyl sulphonate*
$(C_6H_5-CH_2-SO_2-O-C_{10}H_7)$ 19 parts of benzyl sulphonyl chloride is added to a solution of 18 parts of $\beta$-naphthol in 50 parts of water containing 5 parts of sodium hydroxide. The temperature rises, and upon cooling, the crude product is filtered, washed with water, and crystallized from alcohol. Upon drying in the air, it melts at 73–75° C.

*Example 3.—p-t-Octylphenyl benzyl sulphonate*
$(C_6H_5-CH_2-SO_2.O-C_6H_4-t-octyl)$ 19 parts of benzyl sulphonyl chloride is added to a solution of 20 parts of p-t-octyl phenyl in 50 parts of water containing 5 parts of sodium hydroxide. The temperature rises, and upon cooling, the crude product is filtered, washed with water and crystallized from alcohol. Upon drying in the air it melted at 65–66° C.

*Example 4.—Potassium guaiacol sulphonate ester of benzyl sulphonic acid*

19 parts of benzyl sulphonyl chloride was added to a solution of 24.2 parts of potassium guaiacol sulphonate in 50 parts of water containing 7 parts of potassium hydroxide. The mixture became thick and was diluted with 100 parts of water, filtered, washed with cold alcohol and then with ether. It was found to be water soluble. The salt is the potassium guaiacol sulphonate ester or benzyl sulphonic acid.

*Example 5.—p-t Butylphenyl benzyl sulphonate*
$(C_6H_5-CH_2-SO_2.O-C_6H_4-t-C_4H_9)$ 19 parts of benzyl sulphonyl chloride was added to a solution of 14 parts of p-t-butyl phenol in 50 parts of water containing 5 parts of sodium hydroxide. The crude product was filtered. It was crystallized from methyl alcohol and had a melting point of 83–84° C.

Among the other compounds of this class which may be prepared are the benzyl sulphonates of the following phenols and naphthols: o-chlorophenol, p-chlorophenol, o-phenyl phenol, p-phenyl phenol, methyl salicylate, methyl p-hydroxy benzoate, propyl p-hydroxy benzoate, ethyl p-hydroxy benzoate, p-hydroxy benzoic acid, o-hydroxy benzoic acid, p-phenol sulphonic acid, $\beta$-naphthol, etc. Other benzyl sulphonates, such as the p-chlorobenzyl sulphonates, the p-nitro benzyl sulphonates, etc., may be prepared by use of the respective chloro and nitro-substituted benzyl sulphonyl chlorides.

Reference is made to our copending application Serial No. 488,902, filed May 28, 1943, in which is claimed subject matter originally disclosed but not claimed herein.

Having thus described our invention, what we claim as new and desire to secure by Letters Patent is:

1. A compound having the formula:

$$C_6H_5-CH_2-SO_2-O-R$$

wherein R is an aromatic residue.

2. A compound having the formula:

$$C_6H_5-CH_2-SO_2-O-C_6H_4X$$

wherein X is selected from the group consisting of hydrogen and alkyl radicals.

3. A compound having the formula:

$$C_6H_5-CH_2-SO_2-O-C_8H_5$$

4. A compound having the formula:

$$C_6H_5-CH_2-SO_2-O-C_6H_4-t-octyl$$

5. A compound having the formula:

$$C_6H_5-CH_2-SO_2-O-C_6H_4-t-C_4H_9$$

GREGG DOUGHERTY.
ROBERT H. BARTH.

CERTIFICATE OF CORRECTION.

Patent No. 2,373,298. April 10, 1945.

GREGG DOUGHERTY, ET AL.

It is hereby certified that error appears in the printed specification of the above numbered patent requiring correction as follows: Page 1, first column, line 55, Example 3, for "p-t-octyl phenyl" read --p-t-octyl phenol--; and second column, line 51, claim 3, for that portion of the formula reading "$C_8H_5$" read --$C_6H_5$--; and that the said Letters Patent should be read with this correction therein that the same may conform to the record of the case in the Patent Office.

Signed and sealed this 26th day of June, A. D. 1945.

Leslie Frazer (Seal) Acting Commissioner of Patents.